United States Patent [19]

Clymer et al.

[11] 4,218,712

[45] Aug. 19, 1980

[54] MAGNETICALLY SHIELDED IMAGE DISSECTOR TUBE CAMERA

[75] Inventors: John C. Clymer; Nikoli Eberhardt, both of Bethlehem, Pa.

[73] Assignee: Bethlehem Steel Corporation, Bethlehem, Pa.

[21] Appl. No.: 778,512

[22] Filed: Mar. 17, 1977

[51] Int. Cl.² .............................................. H04N 5/00
[52] U.S. Cl. ..................................... 358/229; 335/214; 358/100
[58] Field of Search ....................... 358/100, 229, 245; 315/8; 313/479, 440; 335/214

[56] References Cited

U.S. PATENT DOCUMENTS

| 2,047,020 | 7/1936 | Flaherty | 358/245 |
| 2,605,433 | 7/1952 | Friend | 313/440 |
| 3,008,002 | 11/1961 | Kingsbury | 358/229 |
| 3,052,809 | 9/1962 | Bahring et al. | 335/214 |
| 3,114,799 | 12/1963 | Waters et al. | 358/100 |
| 3,126,498 | 3/1964 | Bendell | 315/8 |
| 3,283,200 | 11/1966 | Pallakoff | 315/8 |
| 3,809,889 | 5/1974 | McBroom | 250/213 VT |
| 3,887,766 | 6/1975 | Caswell | 358/245 |
| 4,028,730 | 6/1977 | Miller | 358/229 |
| 4,039,986 | 8/1977 | Nakazawa et al. | 358/229 |

FOREIGN PATENT DOCUMENTS

| 993578 | 5/1965 | United Kingdom | 358/229 |
| 1190411 | 5/1970 | United Kingdom | 335/214 |

Primary Examiner—Robert L. Griffin
Assistant Examiner—Joseph A. Orsino, Jr.
Attorney, Agent, or Firm—Joseph J. O'Keefe; George G. Dower

[57] ABSTRACT

Image dissector camera with either of two shielding embodiments permits camera to be moveably mounted in earth's magnetic field and strong electrical magnetic fields. Each embodiment includes one or more mu metal closure members adapted to attenuate both axial and radial magnetic fields while the camera is stationary or being moved through the magnetic fields.

1 Claim, 4 Drawing Figures

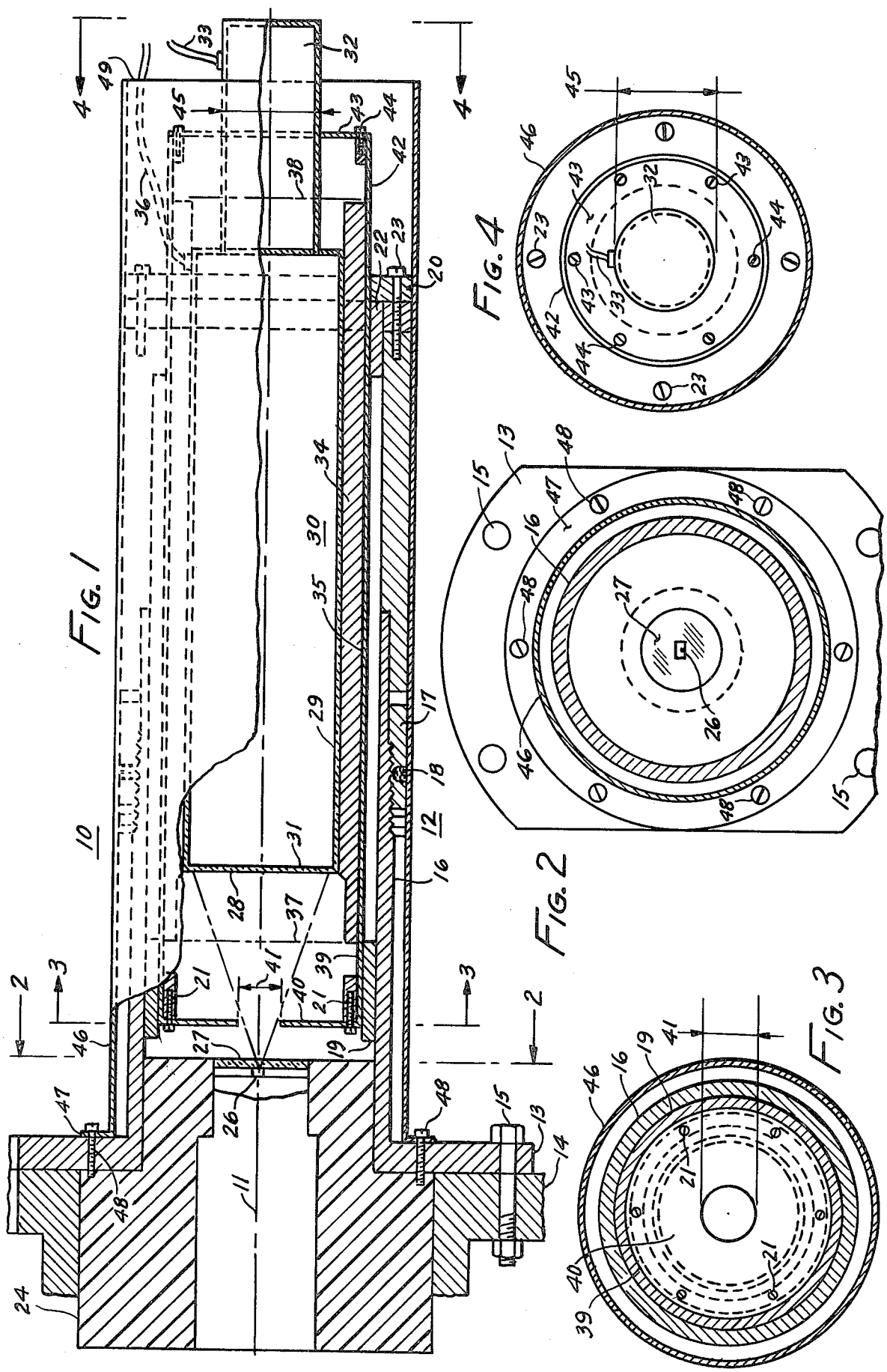

MAGNETICALLY SHIELDED IMAGE DISSECTOR TUBE CAMERA

BACKGROUND OF THE INVENTION

1. Field of the Invention

This invention relates broadly to magnetically shielded electronic cameras of the image dissector and similar types. More particularly, this invention relates to magnetically shielded electronic cameras adapted to be mounted moveably through both axial and radial magnetic fields, including earth's magnetic field and strong electrical field sources, yet operate accurately and reliably in high-gain electro-optical gaging systems.

2. Description of the Prior Art

Computerized steel bar rolling mills constantly require size and profile measurements be made of hot bar moving at speeds up to 4000ft./min. (1219 m./min.). Such bar measurements are frequently made by electro-optical gaging systems having one or more electronic cameras mounted moveably to scan the periphery of the hot moving bar. In commercially available systems, the electronic camera ofttimes includes an image dissector tube operating in a high-gain electronic circuit that will provide suitable sensitivity to detect bar size and profile changes for computer control purposes. However, these electronic cameras have not proved entirely satisfactory in certain steel mill installations for several reasons.

For example, in steel bar rolling mills for producing bar sizes in the range of 3 inches (7.62 cm.), large horsepower mill drive motors are used which are fed by SCR-fired motor controllers. The electronic camera(s) for the bar gaging system must usually be placed near one or both of these devices in order to accurately measure bar size and/or profile. This has the disadvantage of subjecting the very sensitive electronic camera to the effects of a strong erratic electrical magnetic field generated by the mill drive motor and/or its SCR-fired controller. These effects are further compounded during electronic camera movement through these magnetic fields as well as the earth's magnetic field during peripheral scanning of the moving bar to develop profile data. The combined effect on present day commercially available image dissector type electronic cameras is to erratically vary the focal plane as well as the image size of the photocathode as it is being projected upon the electron aperture plane. Thus, for a standard size bar being detected by the electronic camera, the camera output signal may vary to signify a change in bar size when in fact the standard bar size had not changed at all. For instance, it was observed and verified by theory that a change in axial field of one gauss at the photocathode caused a one percent change in the image size. This produces an unpredictable error in bar measurements which is worse when the camera is moving than when held stationary.

SUMMARY OF THE INVENTION

A main object of this invention is to provide an improved electronic camera for use in electro-optical bar gages.

Another object of this invention is to provide improved magnetic field attenuating effects for electronic cameras used in electro-optical bar gages.

The foregoing objects may advantageously be attained by our discovery of extending axially the standard mu metal shielding surrounding the coil assembly of an image dissector type camera and closing the ends thereof, except for an optical aperture to admit a bar image to a photo-sensitive surface of the camera tube. Two embodiments are provided by the present invention for improving shielding against axial and radial magnetic fields having the deleterious effect. One involves redesigning the magnetic shield of commercially available shielded focus and deflection coil assembly. The other involves providing additional mu metal shielding surrounding the standard coil shielding.

BRIEF DESCRIPTION OF THE DRAWINGS

FIG. 1 is an elevational view, partly in crosssection, of a magnetically shielded electronic camera incorporating the present invention.

FIGS. 2–4 are lateral cross-sectional views of the FIG. 1 embodiment.

DESCRIPTION OF THE PREFERRED EMBODIMENT

Reference will be made to FIGS. 1–4. Here, electronic camera 10 is shown with optical axis 11 aimed at an object not shown which, in the present case, is exemplified as a moving hot bar. A cylindrical stainless steel camera housing 12 having mounting flange 13 is assembled to camera mounting structure 14 by bolts 15 so as to achieve coaxial alignment with optical axis 11. An additional environmental housing outside of camera housing 12 may be desired but is not shown in the drawings for reason of clarity.

Included in camera housing 12 is front section 16 formed integrally with flange 13. Front section 16 is threadably engaged with rear section 17 in an arrangement to provide an adjustable-length camera housing 12. After the length is determined below, set screw 18 is tightened to maintain that length adjustment.

Electronic camera 10 also includes lens assembly 24 secured to front section 16 of camera housing 12 by bolt 48. Preferably, lens 24 is a telecentric lens assembly which includes telecentric aperture 26 and blue filter 27. Light rays from lens 24 are brought to focus on image plane 28, which is perpendicular to optical axis 11.

In addition, electronic camera 10 is provided with image dissector tube 29 fixedly supported within a cylindrical shielded deflection and focus coil assembly 30. Preferably, tube 29 is an ITT Co. high resolution image dissector tube No. F4052RP having photocathode 31 behind an image transmitting face positiond at image plane 28. Tube 29 is provided with tube socket housing 32 from which cable 33 conducts signals from electronic camera 10 to external circuits.

The focus and deflection coil assembly 30 includes both X-axis and Y-axis deflection coils and a focus coil potted in place to form coil assembly 34 within mu metal shield 35 described below. Cable 36 conducts signals from external circuits to coil assembly 34.

Front and rear support rings 19 and 22 are welded to mu metal shield 35. They are dimensioned for a snug fit with front section 16 and rear section 17 respectively. Stop flange 20 is also welded to shield 35 adjacent to rear support ring 22 and atttaches to rear section 17 with screw 23. Thus, screw 23 attaches coil assembly 30 containing imaged dissector tube 29 to rear section 17 of the camera housing. The rear section 17 is rotated to adjust the length of camera housing 12 so that the image transmitting face ahead of photocathode 31 is positioned at image plane 28. Set screw 18 locks the front and rear sections 16, 17 of camera housing 12 at this length.

Shielded coils assembly 30 is a modified design of Washburn Laboratory Inc. part no. YF2303-CC3C standard coil assembly. This standard design has a cylindrical mu metal shield 35 that is fully open at front and rear ends at shield terminal planes 37 and 38, respectively. When shield 35 has a permeability of 40,000 min., the attentuation ratio for radial magnetic fields is about 1000 to 1. However, the standard design of shield 35 does not provide sufficient attentuation of axial magnetic fields, regardless of whether electronic camera 10 is stationary or moving. For instance, an axial earth's magnetic field is only attenuated by one-half at the image dissector photocathode.

This shielding deficiency is overcome in part by providing mu metal front shield adaptor ring 39 extending forward to detachable front shield closure 40 and closing down the front end as far as optical opening 41 will permit. Detachable front shield 40 is attached to coil assembly 30 by screw 21 to permit assembly and disassembly of tube 29. Optical opening 41 is dimensioned according to the size of lens 24 in relation to the distance between filter 27 and image plane 28. Mu metal shield additions used herein should preferably have an in-service permeability of 40,000 min.

Additional mu metal shielding deficiencies may be overcome by providing mu metal rear shield adapter ring 42, and rear shield closure 43. Rear shield closure 43 closes down the rear shield opening to the opening shown at 45 for tube socket cover 32.

It is preferred to incorporate the shielding features of front and rear adapter rings 39, 42 and front and rear end closures 40, 43 in the design of standard cylindrical shield 35 before manufacturing these parts. However, standard length shields 35 may be modified in one of two ways. One is to integrate shield 35 with adapter rings 39, 42 and end closure 40 by welding these parts together prior to potting coil assembly 34. The other way is to clamp adapter rings 39, 42 to their respective ends of shield 35 by means not shown.

It will be realized that the greatest attenuation of axial magnetic fields will occur with the greatest integrity of shielding elements. For this reason, the following methods of manufacture are given in their order of preference. First, incorporate the shielding extension features in shield 35 design before manufacturing. Under this condition, attenuation of axial magnetic fields will have an effective ratio of about 20 to 1. Second, welding of shielding extension parts provides slightly less axial magnetic field attenuation than the first method because of possible small leakage between the edges of front adapter ring 39 and shield 35. Third, clamping of shielding adapter rings 39, 42 to the ends of standard shield 35 provides even less axial magnetic field attenuation than does the second method.

If additional shielding against axial magnetic fields is desired, a second mu metal shield 46 is provided to extend beyond the standard shield extensions 39, 42. Second shield 46 has a flange 47 secured to camera housing mounting flange 13 by bolts 48. Second shield 46 extends rearward past shield 35 to rear end 49 which is open entirely. Second shield 46 is sized to fit snugly around camera housing 12 and be supported thereby without any holes or screws connecting second shield 46 to housing 12. Under these conditions, attenuation of axial magnetic fields by second shield 46 will have an effective ratio of about 10 to 1. Thus, a combined attenuation of axial magnetic fields by the first extension of standard shielding and by the second shield will have an effective ratio of about 200 to 1. Greater attenuation of radial magnetic fields will also be had by the addition of the second shield 46.

We claim:

1. A shielded electronic camera capable of being moved through axial and/or radial magnetic fields, comprising:

(a) a nonmagnetic camera housing, (b) lens means supported by the camera housing at one end thereof, (c) an image receiving device supported within the camera housing in alignment with the lens, said device adapted to be scanned while generating a camera signal, (d) shielded deflection coil means supported within the camera housing and operatively associated with scanning the image receiving device, the coil means having a standard cylindrical mu metal shield enclosing just coils and terminating at fully open front and rear ends adjacent coil ends to attenuate essentially a radial magnetic field, (e) the standard cylindrical mu metal shield modified by axially extending cylindrical mu metal shielding means beyond at least one of the standard shield ends to attenuate an axial magnetic field, and (f) the axially extending cylindrical mu metal shielding means is adapted to include first and second mu metal end closure means, the first said end closure means having an optical opening therein adjacent to the lens, and the second said end closure means having an access opening at an end opposite the lens.

* * * * *